*INVENTOR.*
HOWARD J. SHOCKEY

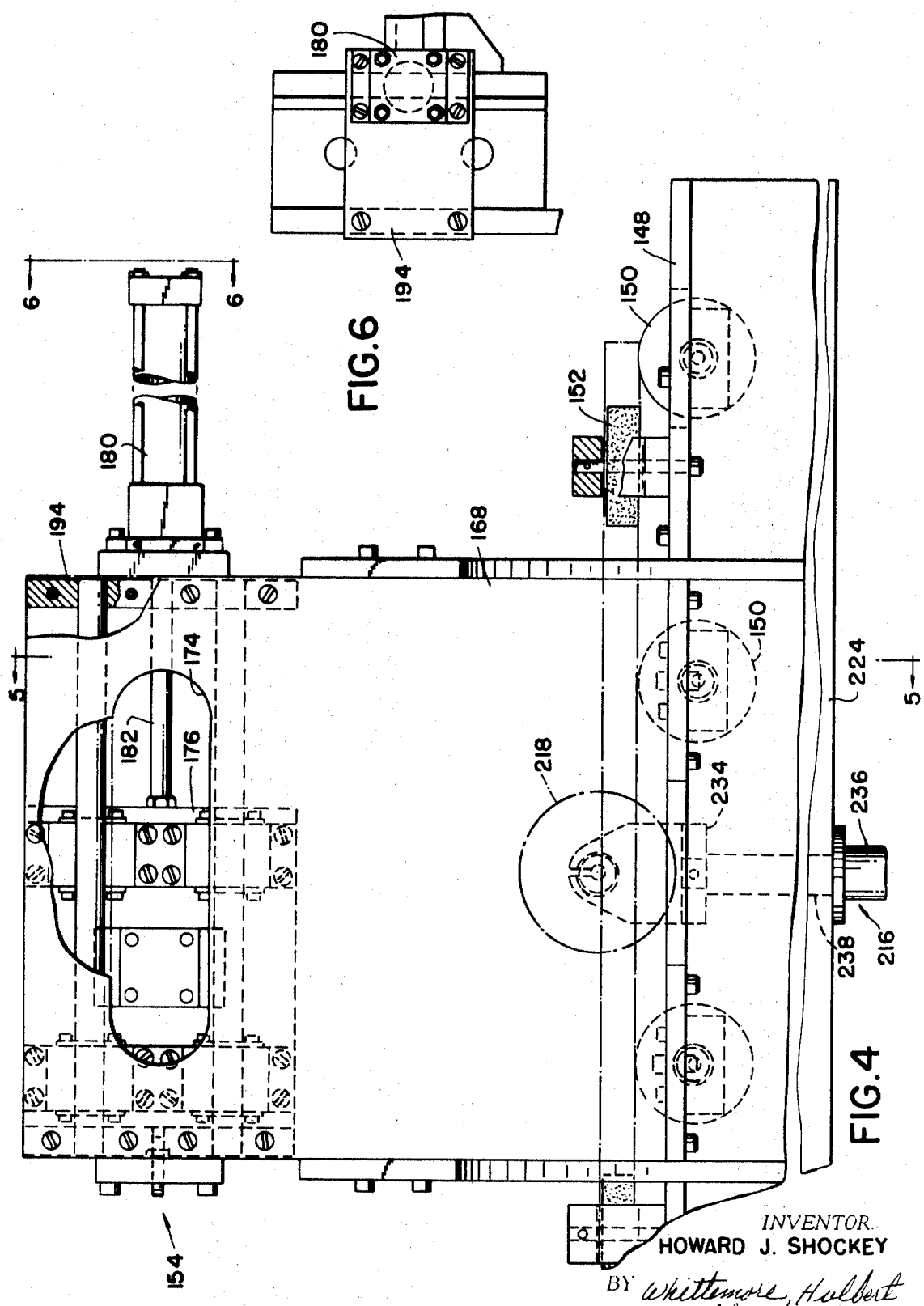

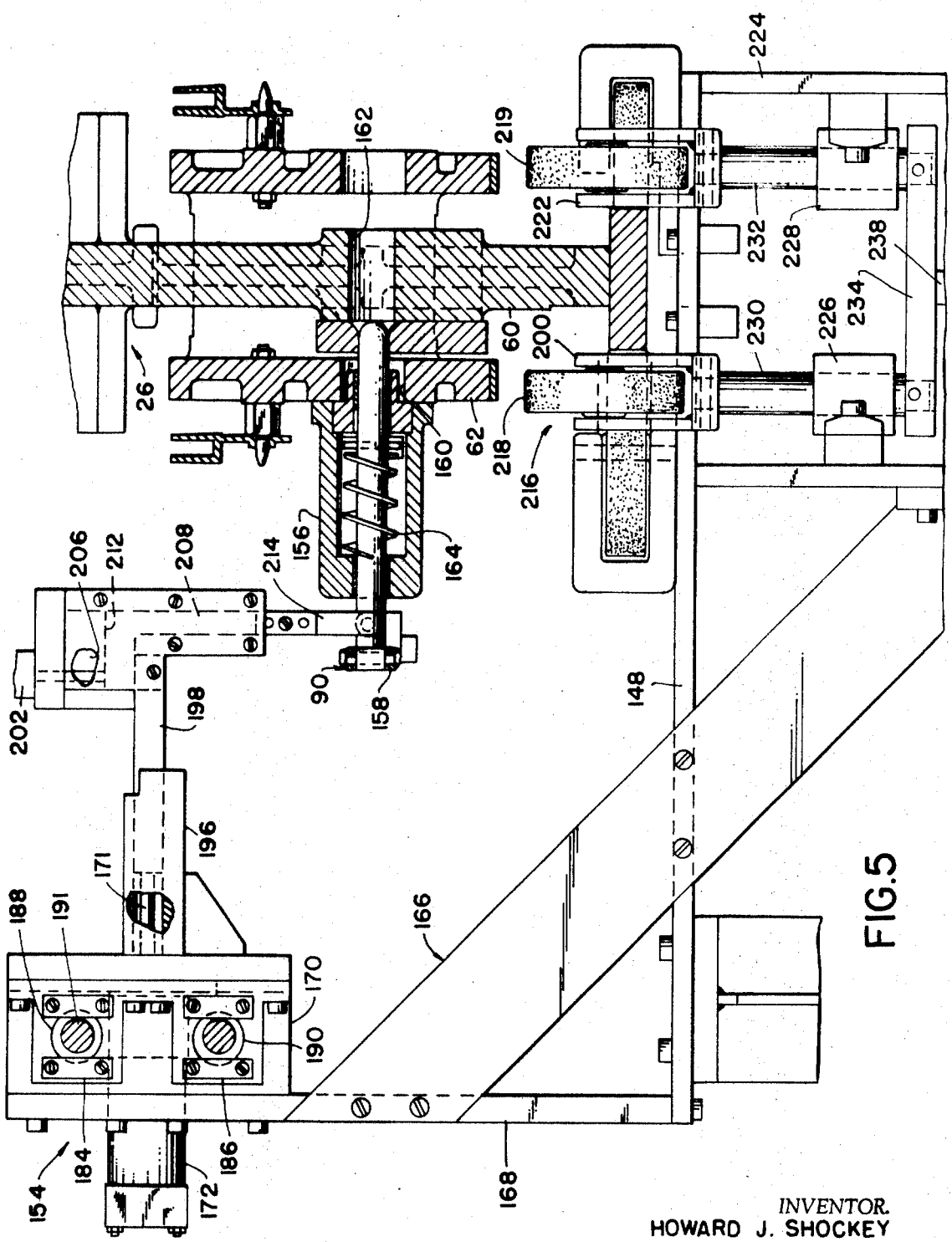

BY *Whittemore, Hulbert & Belknap*

ATTORNEYS

June 23, 1970   H. J. SHOCKEY   3,516,117
APPARATUS FOR BEDDING A PANEL INTO A FRAME
Filed Aug. 4, 1967   6 Sheets-Sheet 6
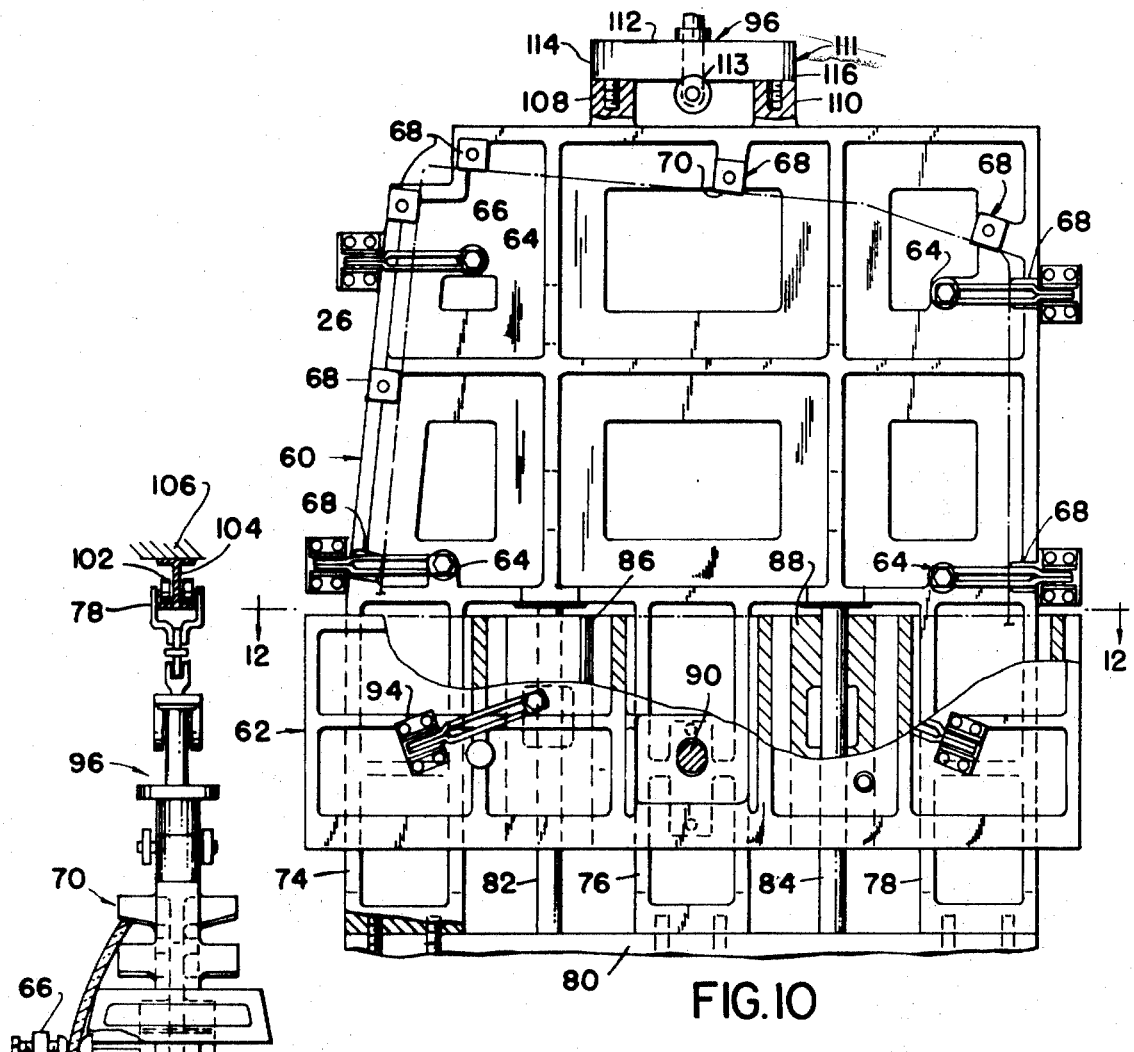
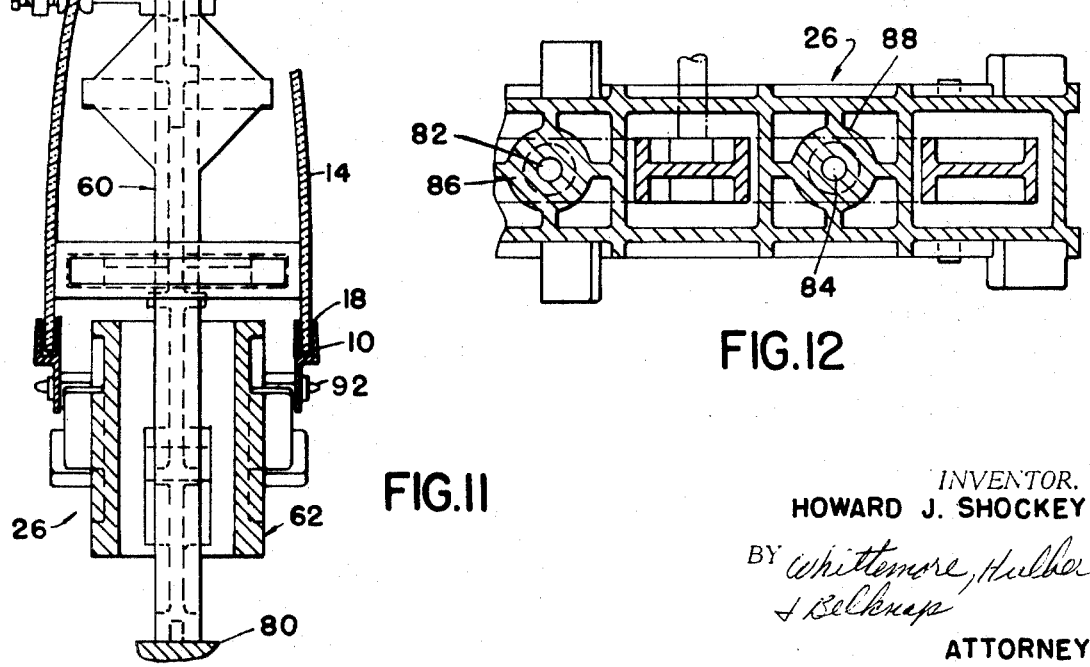
INVENTOR.
HOWARD J. SHOCKEY
BY Whittemore, Hulbert
& Belknap
ATTORNEYS United States Patent Office 3,516,117
Patented June 23, 1970

3,516,117
APPARATUS FOR BEDDING A PANEL
INTO A FRAME
Howard J. Shockey, 1218 Seneca Road,
Benton Harbor, Mich. 49022
Filed Aug. 4, 1967, Ser. No. 672,946
Int. Cl. B29c 3/02, 6/04; B31b 31/02
U.S. Cl. 18—4
14 Claims

ABSTRACT OF THE DISCLOSURE

The apparatus comprises conveyor means for supporting and moving a plurality of fixtures. Each of the fixtures includes a frame mounting member and a panel mounting member which are relatively movable. Means are positioned adjacent to the conveyor for injecting a metered amount of heat curable liquid bedding material into the channel of a frame as the fixture carrying the frame passes thereby. Fixture closing means are positioned adjacent to the conveyor to move the fixture mounting members towards each other after the panel and frame have been mounted and the bedding material has been injected to position a marginal edge portion of the panel in the frame channel. Heating means are then provided to elevate the temperature of the bedding material and cure it to a solid form.

---

In my present invention, I have provided structure including mechanisms for semi-automatically accomplishing the method disclosed in my above-identified application. Basically, I have provided an endless conveyor having an elliptical path in the horizontal plane. A plurality of spaced apart fixtures are hung from the conveyor. The fixtures are adapted to receive the frame and panel members. One portion of the conveyor extends into an oven having a pre-heat portion, curing portion, and a cooling chamber. The remaining portion of the conveyor extends exteriorly of the oven for loading and unloading of the assembly.

The fixture is designed to receive both hands of a sash assembly. That is, one side of the fixture is adapted for reception of the right-hand sash while the other side of the fixture is adapted for receiving the left-hand sash. The sash frame member is first mounted on the fixture. The operator stands on one side of the fixture as it passes thereby. Means are provided to automatically turn the fixture around to present the opposite side thereof to the operator after the first frame member has been secured in place.

As the conveyor moves away from the operator towards the oven, it passes under dispensing means for automatically dispensing into the frame members a metered amount of liquid bedding material. After the frame members have passed the dispensing mechanism, the panels are mounted on the fixture. Again, means are provided for automatically turning the fixture after the first glass panel has been secured in place to present the other side of the fixture to the operator for securing the second glass panel into place. The mechanism for turning the fixture for the operator's convenience is so designed that after the assemblies have been secured in place, the fixture is turned so that the same end, which may be termed the front end, is always presented to the oven after the last assembly operation has taken place. A mechanism is provided for immersion of a marginal edge of the glass panel into the liquid in the frame after the glass panel has been mounted by raising the lower portion to which the frame is secured. The assembly is then passed through the oven whereupon the bedding material is cured. Upon cooling within the chamber and exiting from the oven, the material reaches its maximum physical properties. The sash assemblies are removed from the fixtures and the mechanism automatically lowers the lower portion of the fixture to which the frames are normally secured. The process is then repeated.

BACKGROUND OF THE INVENTION

The present invention is particularly useful in bedding automotive window glass panels into frames, although the invention is not limited to this application. Window glass in automobiles frequently has a metal frame along at least one side of the glass, and in some cases two or more sides are framed. One known way of bedding the glass into the frame involves the use of strips of rubber. A worker covers an edge of a pane of glass with a strip of oil coated unvulcanized rubber and inserts the rubber covered edge into the frame. Any excess is manually trimmed off. Different thicknesses of rubber may be used to accommodate different glass thicknesses.

Because of the relatively high labor costs of this manual method, it has been proposed to mechanize the method. However, the use of different tape thicknesses and the trimming of the excess tape material are difficult to automate.

I have found that the method disclosed in my above-mentioned application may be successfully semi-automated. While complete automation of the method would, of course, be most desirable, the method and apparatus which I have evolved result in permitting use of the method on a commercial scale.

It is, therefore, an object of the invention to provide a semi-automated method and apparatus for bedding panels into frame members.

A further object of my invention is to provide apparatus wherein an endless conveyor is arranged in a compact area and which carries thereon fixtures for mounting of the panel and frame members, the arrangement being such that the fixtures are convenient to workers for manually mounting the elements in place.

Another object of the invention is to provide a fixture structure adapted to have mounted thereon both the left-hand and right-hand sash assembly for a vehicle window.

A still further object of the invention is to provide mechanism associated with the conveyor for automatically turning the fixture around in front of a worker to permit that worker to mount both the left and right hand sash elements without moving from his assigned work area.

Another object of the invention is to provide turning means to orient the fixtures in a desired front to rear position after both the left and right hand sash elements have been secured thereon.

A further object of the invention is to provide means for bedding wherein a channel section frame member is converted into a container by placing damming material transversely across the channel surface of the frame at two locations.

Another object of the invention is to provide means for automatically metering a liquid bedding material into the container defined by the channel and damming material after the frame section has been secured onto the fixture.

A still further object of the invention is to provide means for automatically immersing an edge portion of a glass panel into a frame member filled with bedding material to assure that the panel is immersed to the proper depth and is properly centered within the frame member.

A further object of the invention is to provide an oven structure into which the endless conveyor projects for curing of the bedding material, the oven being so located with respect to the assembly stations to result in an overall compact apparatus.

Other objects of this invention will appear in the following description and appended claims, reference being had to the accompanying drawings forming a part of this specification wherein like reference characters designate corresponding parts in the several views.

In the drawings:

FIG. 4 is a side elevational view with portions broken away for the purpose of clarity illustrating the mechanism for lowering a frame which has been mounted on a fixture to provide clearance for mounting of a glass panel on the fixture;

FIG. 5 is a sectional view taken substantially along the line 5—5 of FIG. 4 looking in the direction of the arrows;

FIG. 6 is an end view of the upper portion of the mechanism illustrated in FIG. 4 as viewed along the line 6—6 of FIG. 4 looking in the direction of the arrows;

FIG. 10 is a side elevational view of one of the fixtures with portions broken away for the purpose of clarity;

FIG. 11 is a sectional view taken substantially along the line 11—11 of FIG. 10 looking in the direction of the arrows with a finished sash assembly mounted thereon;

FIG. 12 is a sectional view taken substantially along the line 12—12 of FIG. 10 looking in the direction of the arrows.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 2:
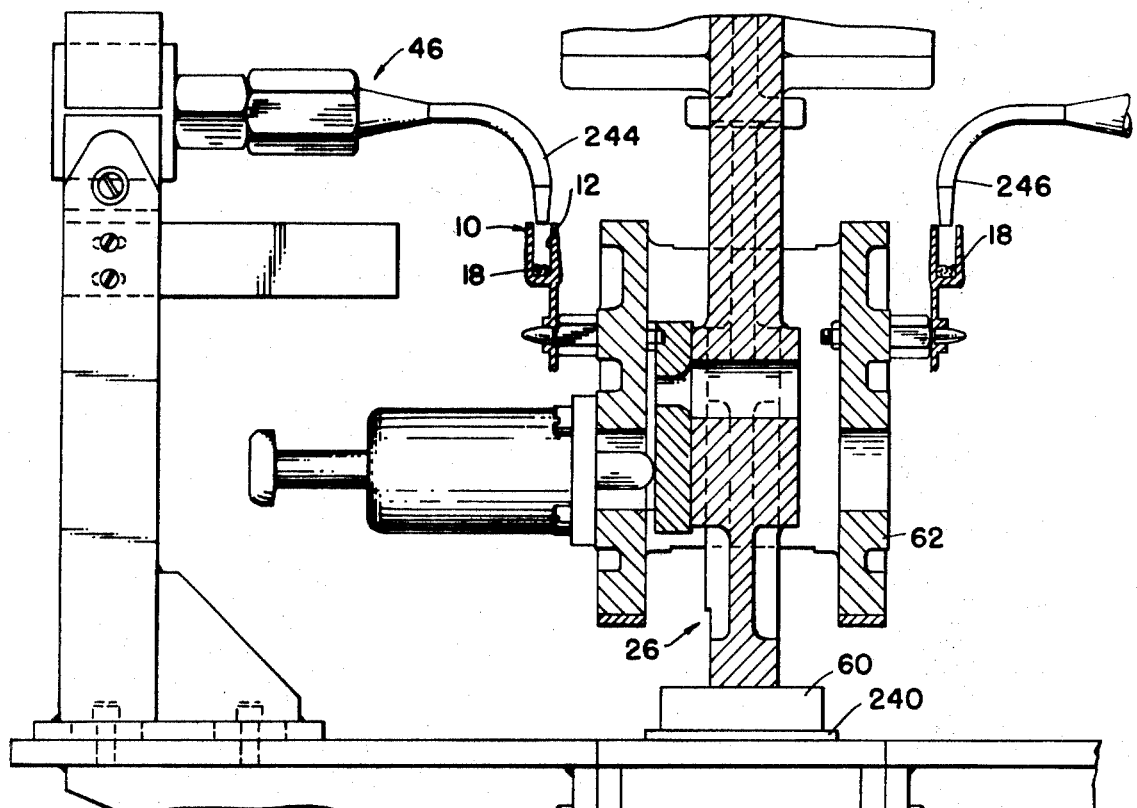
FIG. 2 is a sectional view taken substantially along the line 2—2 of FIG. 1 looking in the direction of the arrows illustrating the structure for automatically injecting a metered amount of liquid bedding material into the frame members.
Figure 3:
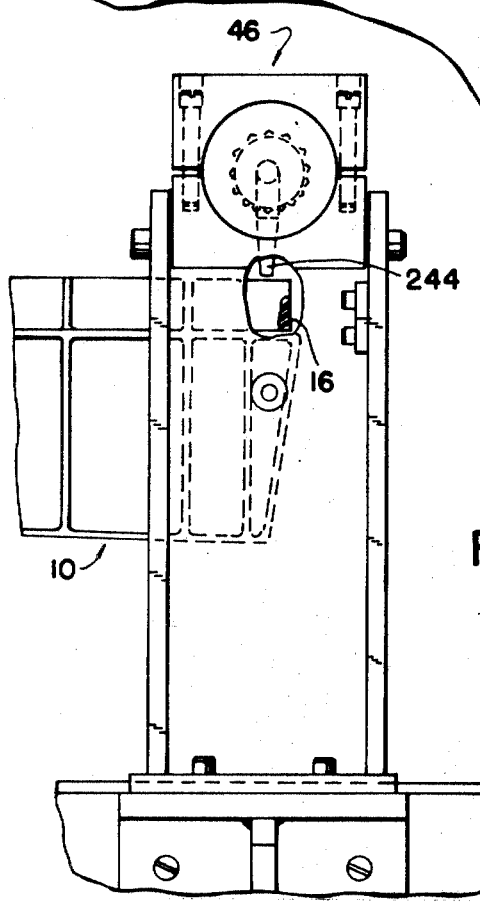
FIG. 3 is an end elevational view of the structure illustrated in FIG. 2 as viewed from the left end.

The basic bedding process used in the present invention may best be understood by reference to FIGS. 2, 3 and 11. A frame member 10 is suitably supported. The frame member 10 has an interior channel surface 12 in which a glass panel 14 is to be bedded. Although a channel-shaped frame is used in the illustrative embodiment described herein, it is to be understood that frames of other configurations may be used. Each end of the frame is, of course, open and must be closed in order to prevent the liquid bedding material which is used from running out after it has been injected into the frame. Consequently, a dam 16, as shown in FIG. 3, is placed within the channel 12 at each end of the frame 10. The dams 16 are preferably globs of pliable material, for example, a gummy or mastic material. A more rigid damming material or even a paper tape may, however, be used if desired.

After the dams have been set in the frame, the frame is filled with a liquid bedding material 18 to a level which will cause the frame to be substantially filled after the edge of a glass panel is immersed therein. Allowance should be made for the liquid which will be displaced by the edge of the panel. This may be accomplished by injecting into the frame only a metered amount of the liquid bedding material which allows for displacement of some liquid by the edge of the panel when it is inserted.

The bedding material should have several properties to withstand the conditions to which it will be exposed. The bedding material may be any suitable resinous material which has the following properties:

(1) Resiliency—to provide a suitable bedding for the glass.

(2) Adherence—to provide a bond between the glass and metal frame.

(3) Curability—to a solid state in a relatively short time by the application of heat, for example, within about 45 seconds at about 300° F.

(4) Resistance to weathering (sunlight, temperature changes and moisture absorption).

(5) Mechanical properties such as tensile strength, compressive strength, impact resistance and toughness sufficient to withstand the stress normally encountered in use of the final assembly.

The bedding material may be any suitable thermoplastic or thermosetting plastic material. One class of resins suitable as bedding materials are the polyurethane resins. Polyurethane resins are obtained by the reaction of polyisocyanates with organic compounds containing two or more active hydrogen atoms to form polymers having free isocyanate groups. Under the influence of heat, the free isocyanate groups react to form a thermosetting material. A suitable thermosetting form may be prepared from castor oil and a triisocyanate. An example of suitable thermoplastic material is polyvinyl resin.

After the bedding material has been injected into the frame, an edge portion of the glass panel 14 is inserted into the channel 12. The glass panel squeezes the pliable damming material and forces it to flow up the sides of the panel, and the panel also displaces some of the bedding material causing it to flow up the sides of the panel and frame as illustrated in FIG. 11.

The next step is to cure the bedding material at an elevated temperature to harden it to the solid state. The entire assembly is placed in an oven which is maintained at an elevated temperature and remains there a prescribed time until the bedding material is cured to a solid state.

Figure 1:
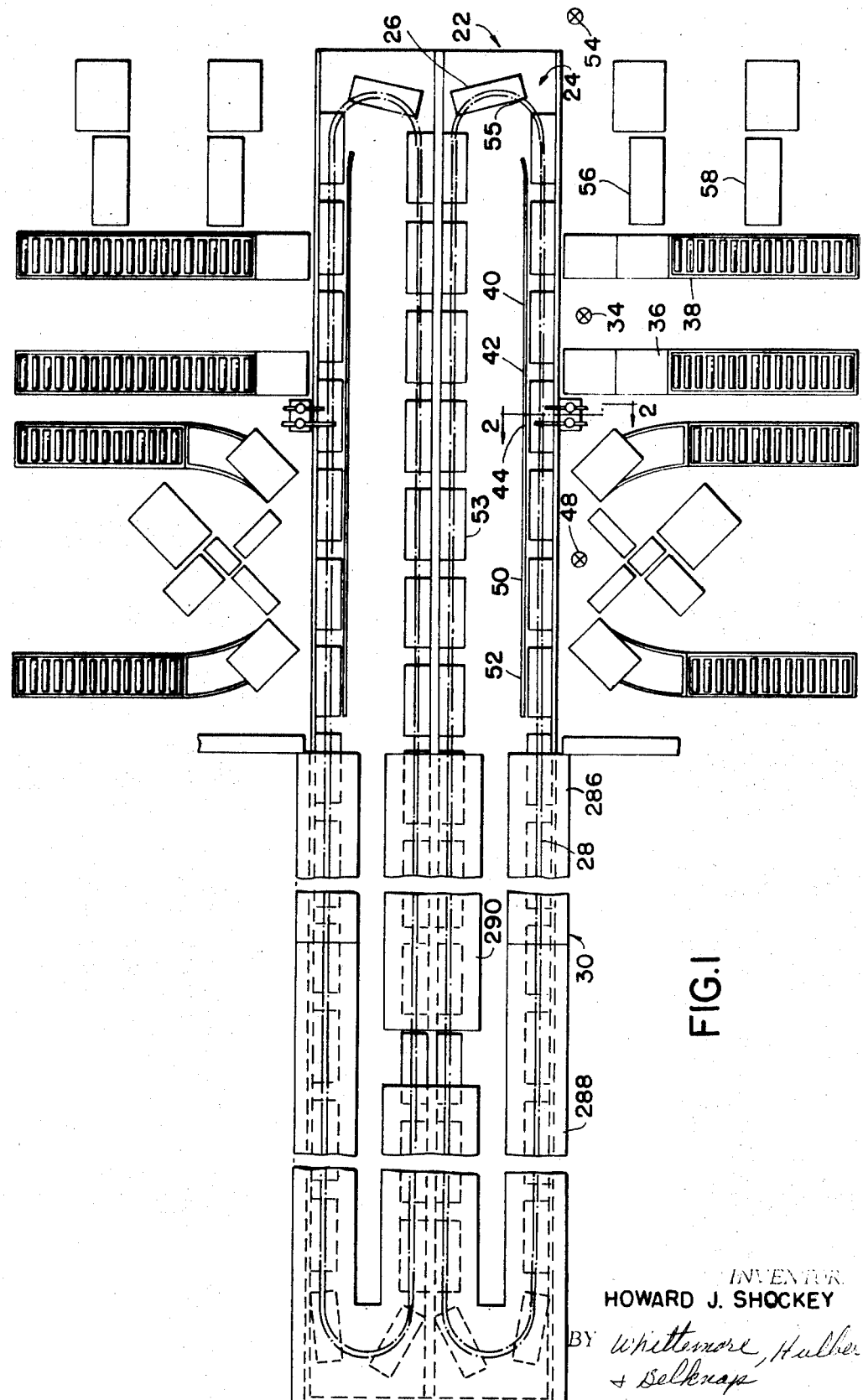
FIG. 1 is a top plan view of the apparatus of the present invention for semi-automatically bedding panels into frame members.
Figure 7:
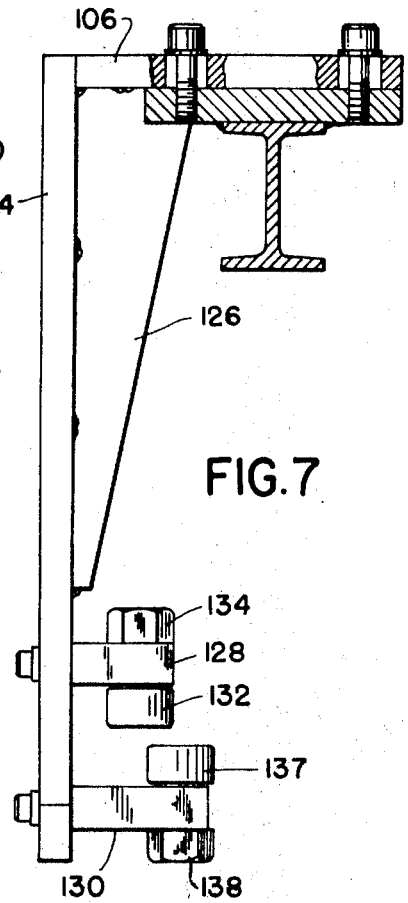
FIG. 7 is an end elevational view of an automatic rotating device associated with the conveyor mechanism for turning the fixture to permit loading of both the left and right hand sash elements by a single operator.
Figure 8:
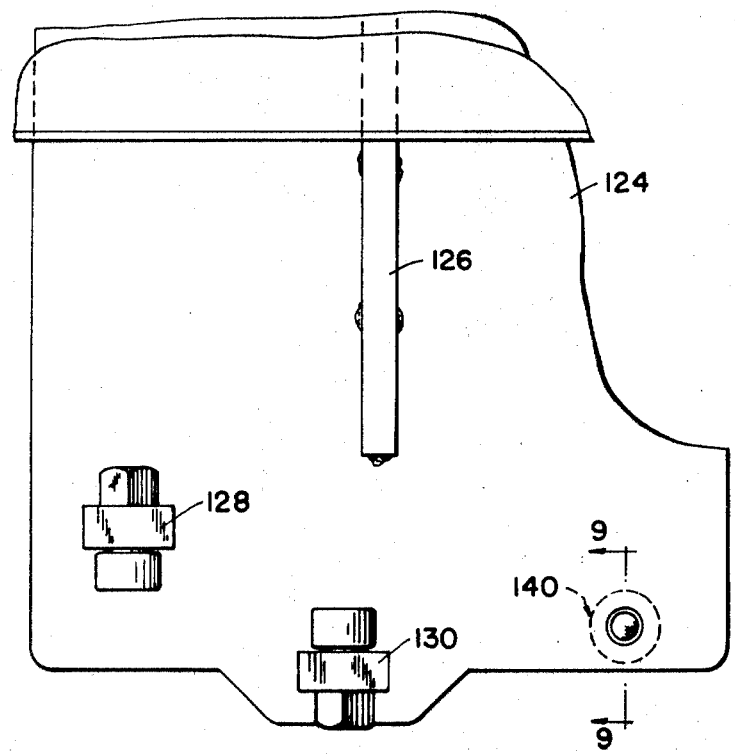
FIG. 8 is a front elevational view of the lower portion of the mechanism of FIG. 7 as viewed from the right.
Figure 9:
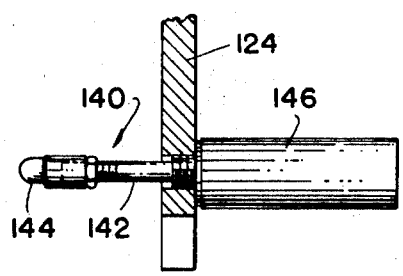
FIG. 9 is a sectional view taken substantially along the line 9—9 of FIG. 8 looking in the direction of the arrows.

FIG. 1 illustrates the apparatus of the present invention for semi-automatically accomplishing the above-described process. A pair of conveyors with associated structure are illustrated in FIG. 1. The system illustrated in FIG. 1 is adapted to manufacture window sash for both the front and rear windows of a four-door automobile. The two structures are for all practical purposes identical and consequently, only one structure 22 will be described in detail. The structure 22 comprises a chain driven endless conveyor 24 which is spaced a suitable distance from the floor to provide clearance for a plurality of spaced apart fixtures 26 carried thereon and to position the fixtures 26 at a suitable height for convenient access by a worker. The conveyor 24 has what may be termed a generally oval or elliptical shape. One portion 28 extends into an oven 30 while the other portion 32 extends outside of the oven to permit access thereto by workers. One worker is stationed at 34 between a pair of feeder roller conveyor structures 36, 38 to mount the frames 10, both right and left hand, onto the fixtures 26. The operator at station 34 not only mounts the frames 10 but also inserts the dams 16 into the frame. The automatic fixture turning structure illustrated in FIGS. 7, 8 and 9 is provided at 40 to turn the fixtures 26 one hundred and eighty degrees to present both sides of the fixture to the operator at station 34 so that he can conveniently mount both the right and left hand frames.

After the frames have been secured in place, the fixture moves on to point 42 where the structure illustrated in FIG. 5 is located. This structure causes that portion of the fixture 26 on which the frames are mounted to drop downwardly a short distance to provide clearance for mounting of the glass panel.

The fixture then moves on to point 44 where the metering and dispensing structure 46 is located. This structure, illustrated in FIGS. 2 and 3, causes filling of the frame channels with a predetermined amount of liquid bedding material.

The fixture next moves on to station 48 where an operator is located for mounting of the glass panels 14 onto the fixture 26. A second turn-around structure is located at point 50 to rotate the fixture one hundred and eighty degrees in front of the operator to permit the operator to mount the glass on both sides of the fixture. It will be appreciated that at this point, the fixture has been rotated three hundred and sixty degrees. Consequently, the same end of the fixture, which may be termed the front end, will always be oriented towards the oven 30 as it enters the oven. This is advantageous in that it prevents human error in the orientation of the fixture. If the operator had to turn the fixture manually, he might occasionally neglect to properly orient the fixture before it entered the oven. This is of importance in connection with a mechanism provided at point 52 for raising the fixture portion holding the frames (FIG. 13) back to the original position. The raising of the frames causes the edge portion of the glass panel to be inserted thereinto to the proper depth to finish the assembly and prepare it for the curing step in the oven 30.

After the fixture has passed through the oven 30, it exits from the oven and is carried back to its original position. A turn-around structure is provided at 53 to again orient the fixture. At station 54, an operator unloads the sash assemblies and places them for inspection on inspection tables 56, 58. A fourth turn-around structure is provided at 55 to permit removal of both sashes from the same side of the conveyor. It will be appreciated that additional operators are provided for other assembly purposes and for feeding materials to the operators present at the stations mentioned.

The basic structure of the fixtures and associated conveyor mechanisms may be understood by reference to FIGS. 10, 11 and 12. Each fixture 26 comprises an inner stationary member 60 and an outer movable member 62. The upper portion of the inner member 60 is configured in the shape of the glass which is to be bedded into the frame. It will be noted that a plurality of resilient, heat-resistant spacer members 64 are provided interiorly of the outer periphery of the members 60 for reception of the glass panel. A manual toggle clamp 66 with a heat-resistant resilient pad is provided to register with each of the spacers 64 for clamping the panel in place. Additional resilient locating members 68 are provided around the periphery of the member 60. Each has a flat surface portion 70 against which the panel rests for proper positionment of the glass panel.

The outer movable fixture member 62 has a generally rectangular configuration with both the upper and lower ends being open. The member 62 fits over three downwardly extending legs 74, 76, 78 which depend from the inner member 60. The legs are joined together by a bottom plate 80. A pair of guide rods 82, 84 extend downwardly from the member 60 intermediate the space between the legs 74, 76, 78 and engage the plate 80. The outer member 62 has a pair of bore cylindrical members 86, 88 which are slidingly received on the rods 82, 84 to guide the outer member 62 in its up and down motion. A pin structure 90 releasably locking the outer fixture member 62 in its uppermost position is provided on the outer fixture member 62 and will be described in more detail in connection with FIGS. 4, 5 and 6. Suitable locating pins 92 are provided on the fixture member 62 for mounting of the frame in the proper position and suitable clamps 94 are provided to releasably secure the frame in place.

The fixtures 26 are mounted on the conveyor 24 by means of a swivel 96 attached to the upper end surface of the inner fixture member 60. The swivel 96 has a pair of fork-shaped members 98 which are secured to the conveyor chain 100 and which carry at their upper ends rollers 102 which ride on the track provided by an I-beam member 104. The member 104 is secured to and supported by suitable support structure 106.

As previously described, the frames 10 are mounted onto the outer fixture member 62 at station 34. A turn-around mechanism is provided at 40 to reverse the side of the fixture facing the operator so that the operator can mount both the right-hand and left-hand frame members at the same station. The turn-around structure may best be understood from the consideration of FIGS. 7, 8 and 9 which illustrate turning structures positioned adjacent to the conveyor and FIGS. 10 and 11 which illustrate structure on the fixture for cooperating with the turning structure.

Referring first to FIGS. 10 and 11, it will be noted that the swivel 96 is mounted on a pair of spaced apart bosses 108, 110 projecting from the upper edge of the inner fixture member 60. The base 111 of the swivel comprises one portion 112 which extends between the bosses 108, 110 and is secured thereto. The ends 114, 116 of the portion 112 are rounded and serve as camming members for turning of the fixture. A second curved and elongated portion 118 is provided on the upper side of the portion 112 and extends at substantially right angles thereto. The rounded ends 120, 122 of the portion 118 also serves as cams for turning of the fixture. The entire structure is termed a "star wheel." Furthermore, the bottom of portion 112 is cut out on a radius and forms a seat for cylinder 113 which keeps the fixture from being rotated at positions on the conveyor other than turn-around stations 40, 50, 53 and 55.

Referring now to FIGS. 7, 8 and 9, it will be noted that a plate 124 extends downwardly from the support structure 106. A bracing member 126 is provided to rigidify the structure. A pair of spaced apart arms 128, 130 are provided on the lower portion of the plate 124. The arm 128 is positioned above the arm 130. The arm 128 carries a roller 132 on its lower face, the roller 132 being secured in place by means of a fastener 134. The arm 130 carries a roller 136 on its upper face, the roller 136 being secured in place by a fastener 138. When one of the fixtures 26 passes the turn-around structure, the end 120 of element 118 contacts the roller 132 causing the fixture to be turned ninety degrees. Further travel of the fixture results in end 114 of element 112 contacting the roller 136 resulting in a second ninety degree turn of the fixture. As will be appreciated, the two ninety degree pivots of the fixture result in a total pivot of 180° thus presenting the opposite face of the fixture to the operator for mounting of a second frame member thereon.

As will be noted in FIGS. 8 and 9, a stop structure 140 is provided on the plate 124. The stop structure 140 is an air cushion device having a piston rod 142 projecting towards the fixtures. A resilient tip 144 is provided on the end of the rod 142 for contact with the fixtures. If a fixture swings too far, it will contact the tip 144 and depress the rod 142. The rod 142 has a piston within the cylinder 146 which operates against an air cushion in the conventional manner to absorb the shock of the fixture, and thus prevent damage to the fixture and the adjacent structures.

The fixture is then moved along to location 42 where the outer fixture portion 62 is dropped downwardly to provide space for mounting of the glass panel. The structure for dropping the outer portion of the fixture is best illustrated in FIGS. 4, 5 and 6. An elongated support table 148 is provided beneath the fixture. A plurality of spaced apart casters 150 project upwardly from the table 148 to receive the bottom surface of the inner fixture element 60. Horizontally oriented casters 152 are provided to engage the sides of the bottom plate of the inner fixture members 60 to guide the fixture in its travel. When the fixture reaches the approximate center of the table 148, a limit switch (not shown) is tripped by the fixture causing a mechanism 154 to pull the pin 90 thereby releasing the outer fixture element 62 and allowing it to drop downwardly.

As will be noted, the pin 90 is received in a casing 156. The pin 90 has an enlarged head 158 in its exterior end for engagement with the pulling mechanism 154. The pin 90 normally projects through an opening 160 in outer fixture element 62 and into an opening 162 provided in the inner fixture element 60 to normally lock the inner and outer fixture members together in the relationship shown in FIG. 10. A spring 164 provided within casing 156 biases the pin 90 to this normal position.

The mechanism 154 comprises a support structure 166 which includes a vertical wall 168. A casing 170 is mounted on the upper portion of the wall 168. A first air cylinder 172 is mounted in the casing 170. A portion of the air cylinder 172 extends exteriorly of the casing through an elongated slot 174 which permits horizontal movement of the air cylinder structure. The air cylinder is secured to a movable plate 176 which is positioned on the forward portion of the casing 170. The plate 176 has bearing retainer support structures 184, 186 each of which retains a pair of spaced apart ball bushings 188, 190 which are slidably received on horizontally extending rods 191, 192 for smooth movement of the entire structure, including the plate 176 and cylinder 172.

A second cylinder 180 is mounted on a plate 194 provided on the end of the casing 170. The cylinder 180 has a piston rod 182 which extends into engagement with the edge of the movable plate 176. The cylinder 180 drives the plate and associated structure back and forth in the desired horizontal movement.

A slide structure 196 extends outwardly from the plate 176 towards the conveyor structure carrying fixtures 26. A slide member 198 is received in the slide structure 196 for movement at substantially right angles to the plane of the plate 176. A piston rod 171 extending from cylinder 172 is secured to the slide member 198 to drive the slide member back and forth in the slide 196 in the desired manner.

A third cylinder 202 is received on support structure 204 provided on the outer end of the slide member 198. The support structure has an interior chamber 206 which slidingly receives an L-shaped slide member 208. The piston rod 210 of the cylinder 202 is attached to one leg 212 of the slide member 208. The cylinder 202 is vertically oriented to move the slide member 208 up and down in a vertical fashion.

The lower end of the slide member 208 extends exteriorly of the lower end of the support structure 204 and carries a yoke 214. The yoke 214, as will be noted in FIG. 5, is positioned with respect to the pin 90 to be normally on the interior side of the enlarged head 158.

Operation of the mechanism 154 may now be understood. As the fixture 26 approaches a position where the pin 90 is positioned beneath the yoke 214, a limit switch (not shown) is tripped causing the cylinders 180, 202 to be actuated. The cylinder 202 causes the yoke 214 to be lowered into engagement with the pin 90 as illustrated in FIG. 5. The cylinder 180 causes the plate 176 to move along at the same rate as the fixture 26 is being moved by the conveyor. After the yoke has been moved to the position illustrated in FIG. 5, the cylinder 172 is actuated to draw the slide member 198 to the left as viewed in FIG. 5 causing the yoke 214 to engage the head 158 of the pin 90 with resultant withdrawing of the pin 90 from the inner fixture member 60. This releases the outer fixture member 62 from engagement with the inner fixture member, resulting in the outer fixture member dropping downwardly. As soon as the outer fixture member has dropped downwardly, the cylinders 172, 180, 202 are actuated to move the various structures of the mechanism 154 back to the original starting position. It will be appreciated that FIGS. 4 and 5 illustrate the structures in a position causing release of the outer fixture member 62. The original position of the plate 176 and associated structure is to the extreme right of the slot 174 as viewed in FIG. 4 while the position of the yoke 214 is a short distance to the right as viewed in FIG. 5 and upwardly above the head of the pin 90.

A shock absorbing structure is provided in the table 148 to receive the relatively heavy outer fixture member 62 and absorb the shock of falling to thus avoid damage to the various structures. As will be noted in FIGS. 4 and 5, the shock absorbing structure 216 comprises a pair of casters 218, 219 which extend upwardly from the table and are in alignment with the lower edges of the side walls of the outer fixture portion 62. Each of the casters is rotatably supported in a caster holder 220, 222. A casing structure 224 is provided beneath the casters and supports a pair of cylindrical bushings 226, 228 which slidingly receive rods 230, 232, each of which is secured to one of the caster holders 220, 222. A bar 234 interconnects the lower ends of rods 230, 232. A cylinder 236, which may be of the air-hydraulic type, is provided on the underside of the casing 224. The cylinder 236 has a piston rod 238 which is connected to the bar 234. When the outer fixture member 62 drops downwardly and contacts the casters 218, 219, the piston rod 238 is driven into the cyinder 236 at a controlled rate, the contents of the cylinder being expelled through a restriction. This breaks the fall of the fixture member 62.

After the outer fixture member 62 has been lowered, the fixture passes beneath the metering station 44 where liquid bedding material is dispensed into the channel of the frame members in metered amounts by means of the metering and dispensing structure 46. This may best be seen in FIGS. 2 and 3. An endless conveyor comprising upper and lower flights 240, 242 is provided beneath the metering and dispensing structure to receive the lower surface of the inner fixture member 60 to move the fixture in a smooth, even manner beneath the dispensing apparatus to avoid any rocking or other erratic motion which might cause a portion of the liquid to be dispensed outside of the frame members.

The metering and dispensing structure includes a pair of dispensing nozzles 244, 246, one on each side of the fixture. The outlet of each of the dispensing nozzles is positioned slightly above the frames and in alignment with the channel defined by the frames. As the fixture passes beneath the dispensing structure, a limit switch (not shown) is tripped actuating the dispensing mechanism whereupon a metered amount of liquid 18 is dispensed into the channels along the lengths thereof. The dams 16 at each end of the channel prevents leakage of the material from the channel.

The fixture then passes to station 48 where the glass panels 14 are mounted thereon. A second turn-around mechanism of the type previously described is provided at 50 for turning the fixture 180° to facilitate mounting of glass panels on both sides of the fixture. As previously mentioned, the fixture is thus again oriented in its original position with the forward end pointed in the direction of travel.

After the glass panels have been mounted, the outer fixture member 62 is moved back to its original position with the pin 90 in engagement with the inner fixture member 60. When the outer fixture member is moved back to this position, the frames, which are now filled with liquid bedding material, are inserted onto the lower edge portions of the glass panels. The liquid material is displaced into the space between the glass panel and the frame, causing this space to be substantially filled and thus preparing the assembly for the final heat curing operation.

Figure 13:
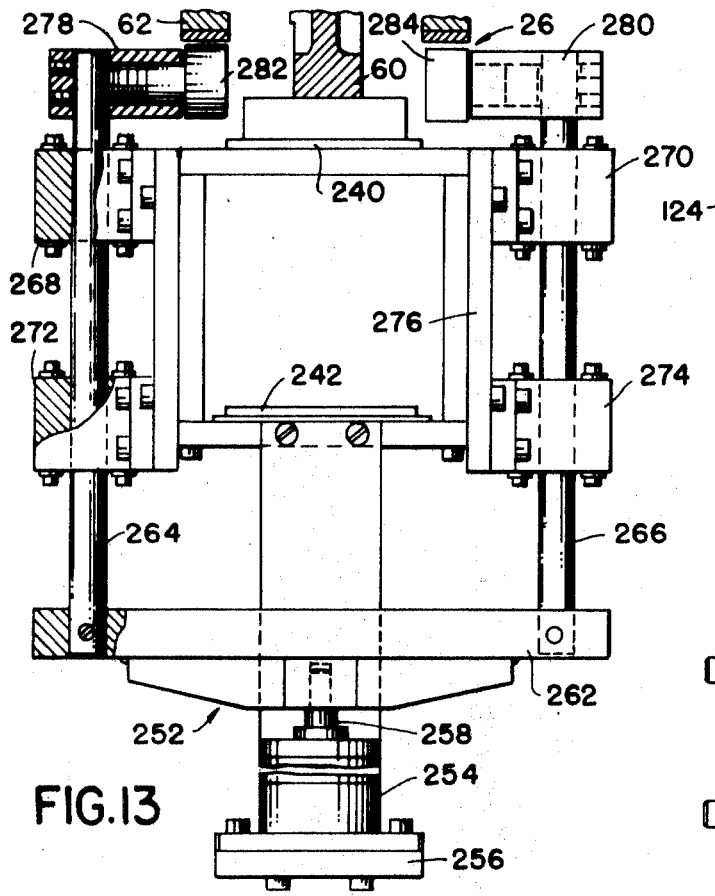
FIG. 13 is an end elevational view of mechanism for elevating a portion of the fixture holding the frame for immersion of an edge portion of the panels into the interior of the frame.

The structure for raising the outer fixture is best illustrated in FIG. 13. The elevating structure 252 illustrated in FIG. 13 is positioned at location 52 as viewed in FIG. 1. A cylinder 254 of the oil-air type is provided beneath the fixture suitably supported on structure 256. The cylinder 254 has a piston rod 258 extending therefrom which contacts a bar 262. The bar 262 has mounted thereon a pair of spaced apart upright guide rods 264, 266. The rods 264, 266 are suitably journaled in bearing structures 268, 270, 272, 274 which are secured to conveyor support structure 276.

A roller retainer 278, 280 is provided at the upper end of each of the rods 264, 266. The retainers project inwardly towards the outer fixture member 62. A roller 282, 284 is rotatably supported in each of the retainers. Each of the rollers 282, 284 is positioned slightly below the outer fixture member 62 and in alignment with one edge thereof. When the fixture is approximately centered over the rollers 282, 284, the cylinder 254 is actuated causing rollers 282, 284 to move upwardly into contact with the outer fixture member 62. The rollers 282, 284 permit the fixture member to continue moving without any appreciable restraint. Continued movement of the rollers upwardly elevates the outer fixture members 62 until the pin 90 is in alignment with the opening in the inner fixture member 60. At this point, the spring 164 biases the pin into the opening and again locks the two fixture members into the position illustrated in FIG. 11. As will be noted, in this position, the bedding material fills the space between the glass panel and frame. The frame is elevated just sufficiently to provide a small space between the lower edge of the glass panel and the bottom of the frame panel. During this process, the dams 16 are also deformed thus continuing to retain the liquid material in the channel.

The fixture 26 then enters the oven 30. As illustrated in FIG. 1, the oven 30 is divided into several chambers. The first chamber 286 is a pre-heat oven where the temperature is somewhat higher than the final curing temperature for the liquid bedding material. The function of the pre-heat oven is to elevate the temperature of the fixture and window assembly sufficiently, since the fixture will soak up a greater percentage of the heat, to permit the assembly to quickly reach the relatively high temperatures necessary for curing. The assembly is thus moved into the curing oven at a predetermined temperature resulting in accurate control of the curing time and temperature.

The fixture moves from the pre-heat oven 286 into a U-shaped chamber 288 wherein the temperature is maintained at the necessary curing point. In the case of one material which has been used commercially, the curing temperature may range from 375° to 430° F.

The fixture exits from the curing chamber into a cooling chamber 290. The function of the cooling chamber is to reduce the temperature of the fixture and window assembly to a point where the bedding material solidifies to a degree where there is sufficient adhesion to permit manual handling of the window assembly. Additionally, the assembly is cooled to a temperature where it may be safely manually handled.

After the assembly exits from the cooling chamber 290, it travels for a distance along the conveyor, is rotated 180° at 53 and is unloaded at station 54 for subsequent inspection, packing and shipping. As previously mentioned, there is another turn-around rotating fixture 180° at 55 so that both assemblies may be removed from the outside of the conveyor.

It will be appreciated from a consideration of the apparatus and method thus described that there is relatively little manual labor involved. There are only three manual operations which must be accomplished, that of loading the frames, loading the glass panels, and unloading the finished assembly. Additionally, the automatic metering of liquid bedding material into the channels assures uniformity of the final products as does the automatic movement of the channel onto the lower edge of the glass panel after the bedding material has been injected.

Having thus described my invention, I claim:

1. Apparatus for bedding a panel into a frame having a channel comprising conveyor means for supporting and moving a plurality of fixtures, a plurality of spaced apart fixtures carried by the conveyor means, each of said fixtures including a frame mounting member and a panel mounting member, said mounting members being relatively movable, means positioned adjacent to the conveyor for injecting a metered amount of heat curable liquid bedding material into the channel of a frame mounted in a fixture as the fixture carrying the frame passes thereby, fixture closing means positioned adjacent to the conveyor to move the fixture mounting members towards each other after the panel and frame have been mounted and the bedding material has been injected into the frame channel to position a marginal edge portion of the panel in the frame channel, and heating means to elevate the temperature of the bedding material and cure it to a solid form.

2. Apparatus as defined in claim 1, and further characterized in the provision of fixture separating means positioned adjacent to the conveyor to move the fixture mounting members away from each other before both the frame and panel have been mounted to avoid interference between the frame and panel during mounting of these elements.

3. Apparatus as defined in claim 2, and further characterized in the provision of releasable fastening means for securing the frame mounting member and panel mounting member together in the position defined by the fixture closing means.

4. Apparatus as defined in claim 3, and further characterized in that the releasable fastening means comprises a movable pin on the frame mounting member, said panel mounting member having an opening to receive a projecting portion of the pin, and spring means biasing the pin into said opening.

5. Apparatus as defined in claim 4, and further characterized in that a portion of said pin extends exteriorly from the frame mounting member away from the panel mounting member, said fixture separating means comprising structure to engage said extending portion of the pin while the fixture is being moved and operable to withdraw the pin from engagement with the panel mounting member and subsequently release the pin to permit the frame mounting member to drop by gravity.

6. Apparatus as defined in claim 5, and further characterized in that said fixture separating means comprises a first pin engaging element movable to engage the pin, first power means to move the pin engaging element into engagement with the pin, second power means to move the pin engaging element in a direction to withdraw the pin from engagement with the panel member, and a third power means to move the pin engaging element and associated structure along with the fixture during disengagement of the pin.

7. Apparatus as defined in claim 5, and further characterized in the provision of shock absorbing means positioned beneath the frame mounting member to receive the frame mounting member after it has been released from the panel mounting member to cushion the drop of the frame mounting member.

8. Apparatus as defined in claim 3, and further characterized in second conveyor means to receive and guide the panel mounting member during the period of time when the frame mounting member is being separated therefrom.

9. Apparatus as defined in claim 1, and further characterized in that said conveyor means comprises an overhead conveyor from which the fixtures are hung, second belt conveyor means receiving the fixtures, while the liquid bedding material is being injected, to guide and steady the fixture during the injection process.

10. Apparatus as defined in claim 1, and further characterized in that said fixture closing means moves the frame mounting member relative to the panel mounting member, said conveyor means being an overhead conveyor from which the fixtures are hung, additional belt conveyor means to receive and guide the panel mounting member during the period of time the frame mounting member is being moved relative thereto to steady the fixture structure during this process.

11. Apparatus for bedding a panel into a frame having a channel comprising conveyor means for supporting and moving a plurality of fixtures, a plurality of spaced apart fixtures rotatably carried by the conveyor means, each of said fixtures including frame and panel mounting means on opposite sides thereof, spaced apart turn-around means positioned adjaent to the conveyor each operable to turn the fixtures 180° to thereby present opposite sides of a fixture to a single operator at each turn-around means to thereby permit a single operator to mount or remove panel and frame units from each station, means positioned adjacent to the conveyor for injecting a metered amount of heat curable liquid bedding material into the channels of frames mounted in a fixture as the fixture carrying the frames passes thereby, means to move the panel and frame towards each other after the panel and frame have been mounted and the bedding material has been injected into the frame channel to position a marginal edge portion of the panel in the frame channel, and heating means to elevate the temperature of the bedding material and cure it to a solid form.

12. Apparatus as defined in claim 11, and further characterized in that each of said turn-around means comprises a pair of spaced apart fixed cam members projecting towards the fixture, each of the fixtures having a star wheel comprising four cam elements extending at right angles to each other and projecting outwardly towards the cam members, said cam members each being operative to contact one of the cam elements as it passes thereby and turn the fixture 90°.

13. Apparatus as defined in claim 11, and further characterized in the provision of shock-absorbing stop means positioned adjacent each turn-around means to contact each fixture after it has been turned 180° to bring the fixture to a cushioned stop.

14. Apparatus for bedding a panel into a frame having a channel comprising conveyor means for supporting and moving a plurality of fixtures, a plurality of spaced apart fixtures carried by the conveyor means, each of said fixtures including frame and panel mounting means, said mounting means being relatively movable, means positioned adjacent to the conveyor for injecting a metered amount of heat curable liquid bedding material into the channel of a frame mounted in a fixture as the fixture carrying the frame passes thereby, fixture closing means positioned adjacent to the conveyor to move the frame and panel mounting means together after a panel and frame have been mounted and bedding material has been injected into the frame channel to position a marginal edge portion of the panel in the frame channel, and heating means to elevate the temperature of the bedding material and cure it to a solid form, said heating means comprising a first chamber for pre-heating the assembly to a predetermined temperature, a second chamber to elevate the temperature of the assembly to a temperature sufficient to cure the bedding material, and a third chamber to cool the bedding material to the solid form.

References Cited

UNITED STATES PATENTS

| | | | |
|---|---|---|---|
| 3,241,277 | 3/1966 | Coppock | 156—295 X |
| 3,281,297 | 10/1966 | Schmidt | 156—293 X |
| 3,295,195 | 1/1967 | Burgid | 29—429 X |
| 3,340,224 | 9/1967 | Sherman et al. | 156—293 X |
| 3,341,889 | 9/1967 | Miller et al. | 18—4 |
| 3,367,824 | 2/1968 | Mallory et al. | 29—200 X |

WILBUR L. McBAY, Primary Examiner

U.S. Cl. X.R.

29—200, 429; 156—293, 295